United States Patent Office 2,923,736
Patented Feb. 2, 1960

2,923,736

PURIFICATION OF CARBOXYLIC ACIDS

Duncan Maclean, Harrogate, England, assignor to Imperial Chemical Industries Limited, London, England, a corporation of Great Britain No Drawing. Application November 18, 1957
Serial No. 696,927

Claims priority, application Great Britain
November 28, 1956

6 Claims. (Cl. 260—525)

This invention relates to the purification of carboxylic acids, more particularly to the purification of terephthalic acid.

In the production of terephthalic acid a common method of manufacture includes an oxidation process during which metal containing substances are present, for example, as catalysts. These metal substances are often found as impurities in the resultant acid to the total extent of up to 3% by weight. The metal impurities to be found are compounds of metals such as manganese, cobalt, titanium, iron and barium.

According to the present invention we provide a process for the purification of crude terephthalic acid containing metallic and organic impurities, either individually or collectively, wherein a flow of an entraining gas is passed through a bed of the crude acid at a rate sufficient to fluidise the bed and at a temperature sufficient to entrain the terephthalic acid and any organic impurities present which are volatile at the temperature of entrainment, the terephthalic acid and the organic impurities being removed from the fluidising zone, and the terephthalic acid separated and collected.

By the process of our invention the metallic impurities and any other involatile impurities from the crude terephthalic acid remain in the fluidised bed, from which they can be removed by periodic purging.

We prefer that the vapour phase solution containing the terephthalic acid and the organic impurities is led from the fluidising bed and passed to a condenser in which the purified terephthalic acid is condensed and removed.

We have found that air, nitrogen or super-heated steam, either alone or in admixture, are very suitable gases for entraining purposes.

It has been found desirable to add the crude terephthalic acid to a bed of terephthalic acid which has already been fluidised, in order that the entrainer can be more than 80% saturated with terephthalic acid in a short contact time, to enable an efficient fractional condensation of the purified terephthalic acid from the vapour phase solution in the entrainer.

The bed containing the terephthalic acid may have added to it an inert solid, for example, alumina or sand, to assist in the fluidisation of the bed.

In a preferred embodiment of our invention, to enable efficient temperature control of the condensation conditions, the saturated entrainer is passed through a series of fluidised beds of terephthalic acid under controlled temperature conditions. The terephthalic acid obtained from the first condensation bed is substantially pure terephthalic acid and that from subsequent beds of lowering degrees of purity. If the terephthalic acid recovered from the second or subsequent beds is not sufficiently pure for the ultimate purpose for which it is required, it may be re-entrained.

Alternatively, the saturated entrainer is passed into scraped surface condensers or cyclone separators working under controlled temperature conditions.

The temperature of the first condensation is controlled at a temperature greater than 150° C. according to the nature of the feed of the crude acid and the degree of purification that is required. In general the more crude is the feed or the greater the degree of purification that is required, the higher will be the temperature of condensation.

The process may be undertaken at atmospheric pressure, thus it can be readily operated continuously. However, the process may be suitably undertaken at sub-atmospheric pressures, thus permitting the production of increased yields for the same mass air flow rate over operations undertaken under atmospheric pressure conditions.

The crude acid may be purified more completely by subjecting the acid or acids to treatment two or more times. However, after even one treatment we have found the terephthalic acid to be substantially free of metallic impurities and organic impurities such as para-toluic acid and para-aldehydobenzoic acid.

While the process is exemplified in relation to the purification of terephthalic acid obtained from single aromatic hydrocarbons, we have found the process suitable for the purification of the oxidation products of mixed aromatic hydrocarbons, such as of mixed xylenes, which are the phthalic acids and benzoic acid. These may be purified either individually or collectively.

The following examples, in which all parts and percentages are by weight, illustrate but do not limit the scope of our invention.

Example 1

The terephthalic acid used (strength 94.7%: optical density (as defined below) 0.21) was made by air oxidation of para-xylene and contains para-toluic acid (2%) and para-aldehydobenzoic acid (3%) as impurities together with small amounts of cobalt, manganese, iron and barium salts as metallic impurities. This material was screw-fed continuously into a fluidised bed of terephthalic acid to which alumina had been added to assist fluidisation. Fluidisation was effected with air preheated to 300° C. the bed also being maintained at 300° C. The air leaving the bed was more than 80% saturated with terephthalic acid and contained the organic impurities and was passed through a filter to prevent mechanical carry over and thence to a cyclone separator working at 220° C., another working at 150° C. and finally through a bag filter at 25° C. The cyclone separators were scraped periodically to prevent build up of large crustations.

The following table shows the fractionation achieved.

| Bed Temperature | Product collected at— | | | | | |
|---|---|---|---|---|---|---|
| | 220° C. | | 150° C. | | 25° C. | |
| | O.D. | Strength, percent | O.D. | Strength, percent | O.D. | Strength, percent |
| 300° C. | 0.08 | 99.9 | 0.175 | 91.8 | 0.20 | 80.3 |

Optical Density (O.D.)=optical density of 4% ammoniacal solution as measured at 380 mµ in a Unicam spectrophotometer.

Analysis showed the fraction collected at 220° C. to be substantially free of para-toluic acid and para-aldehydobenzoic acid and also free from metallic impurities.

The metallic impurities remained on the sublimation bed and were removed by periodic purging.

Example 2

Terephthalic acid made by the catalytic air oxidation of para-diisopropylbenzene contained 2.5% of metallic impurity consisting of cobalt, manganese, and iron compounds. 50 parts of this acid was placed on a porous support in a 2" diameter glass column and air at 350° C. was passed up this column at a rate of 500 litres per hour measured at standard temperature and pressure which was a sufficient rate to fluidise the bed. A layer of glass wool at the top of the column ensured that no mechanical carry-over took place. The product was collected in an air condenser and periodically scraped into a receiver. The air outlet to the atmosphere was covered with a bag filter to collect the "fines" which remained mechanically entrained after passing through the condensing system.

The product of 45 parts terephthalic acid contained a total metallic impurity of only 0.025%.

What I claim is:

1. In a process for the purification of terephthalic acid by sublimation, the improvement which comprises passing an inert gas through a bed of crude terephthalic acid under fluidizing conditions at a temperature of at least 300° C., whereby said terephthalic acid is evaporated and entrained in said inert gas along with sublimed impurities and thereafter fractionally condensing the sublimate at a temperature greater than 150° C.

2. The process of claim 1 wherein said inert gas is air.

3. The process of claim 1 further defined by fractionally condensing said sublimed terephthalic acid on a condenser surface and continuously scraping said surface.

4. The process of claim 1 wherein said bed of said crude terephthalic acid is admixed with finely divided inert solids and said inert solids are fluidized along with said crude terephthalic acid in the bed.

5. The process of claim 1 wherein the terephthalic acid is fractionally condensed at a temperature of about 220° C.

6. The process of claim 1 wherein the terephthalic acid is fractionally condensed by passing the inert gas containing the terephthalic acid through a fluidized bed of terephthalic acid maintained at a temperature greater than 150° C.

References Cited in the file of this patent

UNITED STATES PATENTS

| | | |
|---|---|---|
| 1,852,782 | Jaeger | Apr. 5, 1932 |
| 1,987,282 | Comte | Jan. 8, 1935 |
| 1,987,301 | Livingston | Jan. 8, 1935 |
| 2,578,326 | Toland | Dec. 11, 1951 |

OTHER REFERENCES

Chemical Engineers Handbook, 3d ed., p. 661 (1950).

Lange: Handbook of Chemistry, 8th ed., pp. 640–641 (1952).